Aug. 15, 1933.　　H. G. KOEPKE　　1,922,589
OILING SYSTEM
Filed July 28, 1927　　3 Sheets-Sheet 2

Inventor
Henry George Koepke,
By Earl T. Ragan
Attorney

Aug. 15, 1933.  H. G. KOEPKE  1,922,589
OILING SYSTEM
Filed July 28, 1927   3 Sheets-Sheet 3

Inventor,
Henry George Koepke,
By Earl T. Ragan
Attorney

Patented Aug. 15, 1933

1,922,589

UNITED STATES PATENT OFFICE 1,922,589

OILING SYSTEM

Henry George Koepke, Chicago, Ill., assignor, by mesne assignments, to Standard Brands Incorporated, Dover, Del., a corporation of Delaware Application July 28, 1927. Serial No. 209,130

8 Claims. (Cl. 308—170)

My invention relates to improvements in lubricating or oiling systems for bearings and is particularly adapted for use in lubricating or oiling a plurality of shaft bearings by a system in which lubricant or oil is fed from one to another of the bearings.

My invention in a specific embodiment as hereinafter described possesses marked advantages as applied to centrifugal separators, particularly those of a type adapted for separating liquid mixtures into components of different specific gravity, especially separators adapted and used for the separation of yeast from a large proportion of liquid, with which it may be associated.

Still more particularly in its preferred specific embodiment as hereinafter described, my invention relates to means for, and a method of, oiling bearings of a centrifugal separator of the type referred to in such a manner that the bearings will be provided with an ample supply of oil in a particularly economical and effective manner.

An object of my invention is to provide a system for oiling bearings of centrifugal separators of the type referred to and hereinafter described, or for oiling bearings of other shafts, either horizontal or vertical, so that lubrication of the bearings will be accomplished in an efficient, positive and economical manner. Other and more detailed objects of the invention will in part be more particularly pointed out hereinafter and will in part be apparent from the description of my invention and from the accompanying drawings which illustrate a preferred embodiment of the invention.

Figure 1:
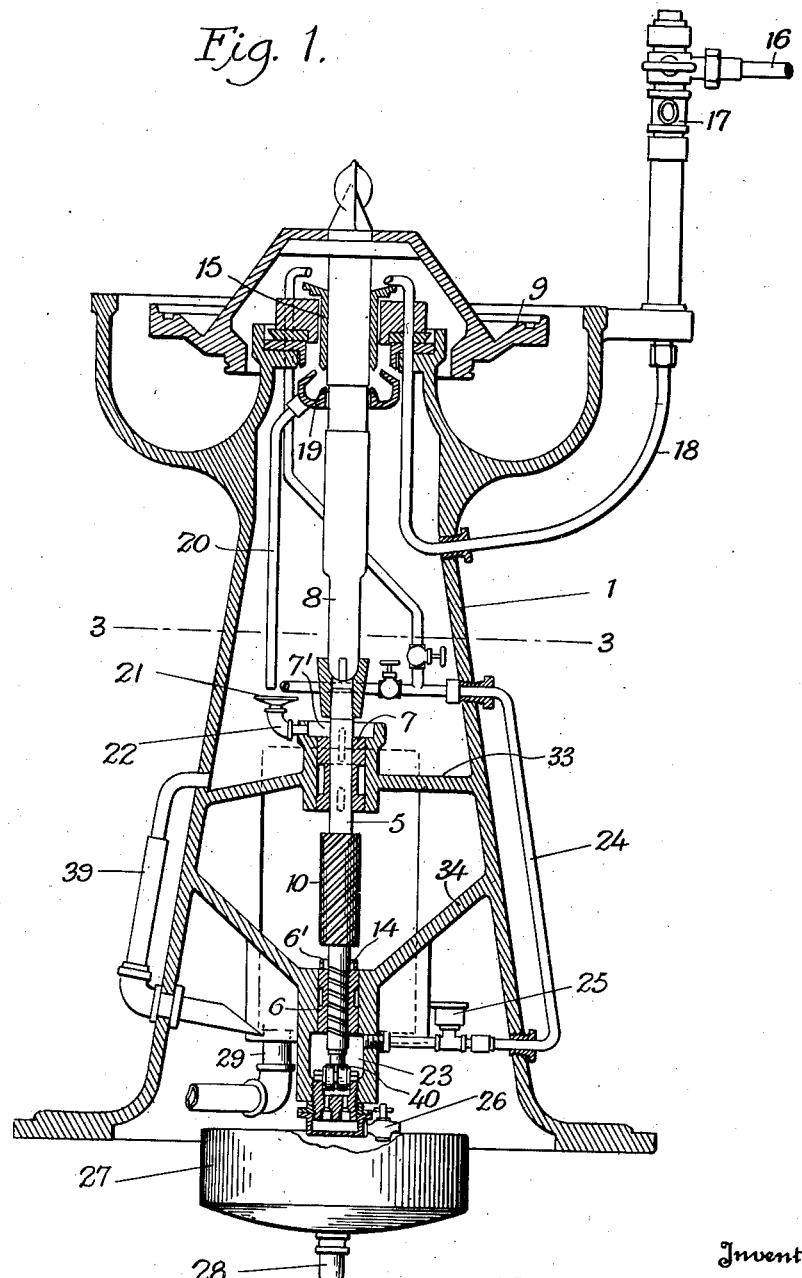
Fig. 1 represents a sectional view of the lower portion of a centrifugal separator of the type referred to, embodying my improvements and showing the bowl base and such portions of the separator as are positioned therebelow.

In the preferred embodiment of my invention, as illustrated in the drawings, 1 represents the lower casing or frame of a separator which may be positioned upon a base 2 or other suitable support and may be provided with side openings normally closed by doors or cover plates 3, 4, the opening or removal of which affords access to various parts of the apparatus within the casing.

Within the casing 1 a vertical shaft or worm screw spindle 5 is mounted in suitable bearings 6 and 7 which may be formed with bushings suitably mounted in inward extensions or cross members 33, 34 of the separator casing or frame. This shaft 5 is operatively connected with a superposed shaft or bowl spindle 8, at the upper end of which the bowl base 9 of the separator, together with its associated and connected parts, is mounted for rotation thereby. The shaft 5 and connected parts may be rotated by means of a worm 10 mounted thereon or forming an integral part of the shaft 5 and driven by an intermeshing worm wheel 11, mounted upon a shaft 12 which is driven by any usual or convenient, suitable source of power.

The worm wheel 11 is mounted so that its lower portion is positioned within a pocket or oil trough 13 formed within the separator casing and which, in the normal operation of the separator, is adapted to contain a sufficient quantity of oil to assist in lubrication of the worm wheel, itself and by the splashing or atomization of the oil to assist also in lubricating other adjacent moving parts of the separator.

In order to provide an especially advantageous and positive lubrication of the portion of the shaft 5 rotating within the lower bearing 6, such portion of the shaft is provided with a helical groove 14 cut in the shaft in such a direction that, in the normal rotation of the shaft, oil supplied to this bearing will be positively forced in a downward direction through the bearing by the coaction of this helical groove and the interior surface of the bearing or bearing bushing.

In the preferred embodiment of the invention as is illustrated in the accompanying drawings the helical groove 14 extends throughout the entire length of that portion of the shaft 5 which is positioned within the lower bearing 6 so that a positive downward forcing action is exerted upon the oil throughout the entire length of the bearing 6 and this positive forcing action cooperates with the force of gravity in causing an ample and abundant supply of oil to enter into and pass through the bearing.

By this action a cooperative effect is attained between the natural influence of gravity and the action of the means positively operating within the bearing so that even at the very high speeds of rotation at which the shaft may operate for long periods of time, the bearing is efficiently lubricated with an ample supply of circulating oil at all times.

The separator is provided with an upper bearing 15, within which a portion of the shaft or bowl spindle 8 adjacent its upper end rotates. Separators of the type to which my invention particularly relates are adapted for operation at high speeds and in their normal operation are customarily driven at speeds which may approximate 5000 or more revolutions per minute. Because of their operation at such high speed, it is particularly desirable that the bearings of such separators should be lubricated in a thoroughly efficient manner with an adequate quantity of oil at all times during their operation. For this purpose, in the operation of my invention in its preferred specific embodiment, lubricating oil may be supplied through a pipe 16 and sight feed lubricating device 17 by way of an oil pipe 18 to the upper inlet end of the upper bearing 15. Thence, the lubricating oil flows downwardly through the bearing 15 and such oil as passes through this bearing is in large part, at least, caught within the annular oil collecting trough 19 positioned around the shaft or bowl spindle 8 adjacent the lower end of the bearing 15. From this annular oil collecting trough 19, oil flows downwardly through a pipe 20 and is delivered to an intake funnel 21 of an oil pipe 22, which discharges into the upper end of the bearing 7 through an oil pocket 7' which is preferably provided, as shown, at the upper end of the bearing 7. Oil flowing downwardly through the bearing 7 in part finds its way onto the worm 10 and worm wheel 11, directly, and also, in part, indirectly, after having flowed into the oil pocket 13 and, in part, continuing its downward course, enters the upper end of the lower bearing 6, which also preferably is provided with an oil pocket 6' at its upper end. Such oil as enters the upper portion of the lower bearing 6 tends, to a certain extent, by gravity, to work its way downwardly through this bearing and in my novel construction the gravitational passage of lubricating oil, through this lower bearing 6, is very greatly augmented by the action of the helical groove 14 on the shaft 5 and extending through this bearing, thus insuring that this lower bearing is thoroughly lubricated at all times in the operation of the separator by a film of oil which is continuously forced through the bearing under positive pressure and without the use of any added moving parts.

At the lower end of the bearing 6 an oil pocket 23 is provided, in which tread wheels 40 and other suitable adjusting and supporting devices (which may be of any usual or preferred construction) are mounted. Connected with the oil pocket 23 I provide an oil circulation pipe 24, the outlet end of which discharges into one of the shaft bearings of the separator which is positioned at a higher level, suitably into the middle bearing 7 through the oil funnel 21 and pipe 22 in the preferred embodiment of my invention, as illustrated. In the operation of the separator, according to my invention as preferred, oil in the oil pocket 23, under pressure from incoming oil, continuously supplied to the pocket by the action of the helically grooved portion of the shaft within the lower bearing, is continuously forced through the pipe 24 and back into the middle bearing, so that a continuous circulation of oil may be, in this construction, maintained through the lower and middle bearings of the separator.

As shown in Fig. 1, it is also within the scope and purview of my invention to extend the oil circulation pipe 24, so that it will discharge oil into the upper bearing 15 of the separator, or to provide this pipe with valved branches whereby oil passing therethrough can be fed in whole to either or in part to both of the bearings 7 and 15, as may be desired. The pipe 24, suitably in proximity to the oil pocket 23, may be provided with a closed oil cup 25 or other suitable means for introducing oil from an external source when desired through the lower portion of the pipe 24 into the oil pocket 23, as may be expedient for providing a suitable quantity of lubricant in starting up the operation of the separator, especially if the oiling system is air-bound.

Connected with the lower end of the oil pocket 23, a drain valve 26 is provided discharging into a receptacle 27, whence lubricating oil, after use in the separator, may be drawn off through a pipe 28 for discharge or for treatment in a suitable purifying or reclaiming apparatus for re-use.

The bottom of the oil trough 13, within which the worm wheel 11 rotates, is provided with a discharge pipe 29, leading to a lower level and which is provided with an upwardly extending pipe 30 having a discharge outlet 31 at a level suitably positioned above the bottom of the trough 13, whereby a constant level of oil may be maintained in the trough 13 during the normal operation of the separator. Adjacent the lowermost portion of the pipe 29 a drain valve 32 is provided, through which oil may, when desired, be drained from the oil trough 13. In the normal operation of a separator constructed in accord with my present invention and as shown in the drawings, the pipe 29 will serve as a clarifying chamber and water and broken down oil which collect in this pipe will be discharged through the tubes 30 and 31 by the weight of the oil in the trough or chamber 13. The drain valve 32 may also serve the purpose of drawing off, from time to time, any sludge or other accumulations in the pipe 29 but ordinarily this drain valve 32 need be and will be only used when it is necessary or desired to drain all of the oil from the separator as, for example, when making necessary repairs.

The method of lubricating centrifugal separators, according to my present invention, is entirely automatic and according to this method the oil is sufficiently clarified continuously during the operation of the separator, providing a suitably regulated quantity of fresh oil is fed through the lubricator 17. My improved oiling system is especially adapted to belt-driven separators of the type illustrated in the accompanying drawings, but is not restricted to separators of the particular specific construction shown.

In actual practice, in the use of my invention, in the case of a yeast separator as herein described and with a vertical shaft, the diameter of which within the lower bearing may be approximately three-quarters of an inch, I have found that it is suitable to provide a helical groove, upon the portion of the shaft within the bearing 6, of such a pitch as to make about one and one-half turns per inch of the shaft's length. I do not, however, wish to restrict my invention to a groove of this particular pitch, as it is evident that this might be somewhat varied and that other variations might be made in certain details from the construction which I have herein particularly described, while still remaining within the scope of my invention.

Figure 2:
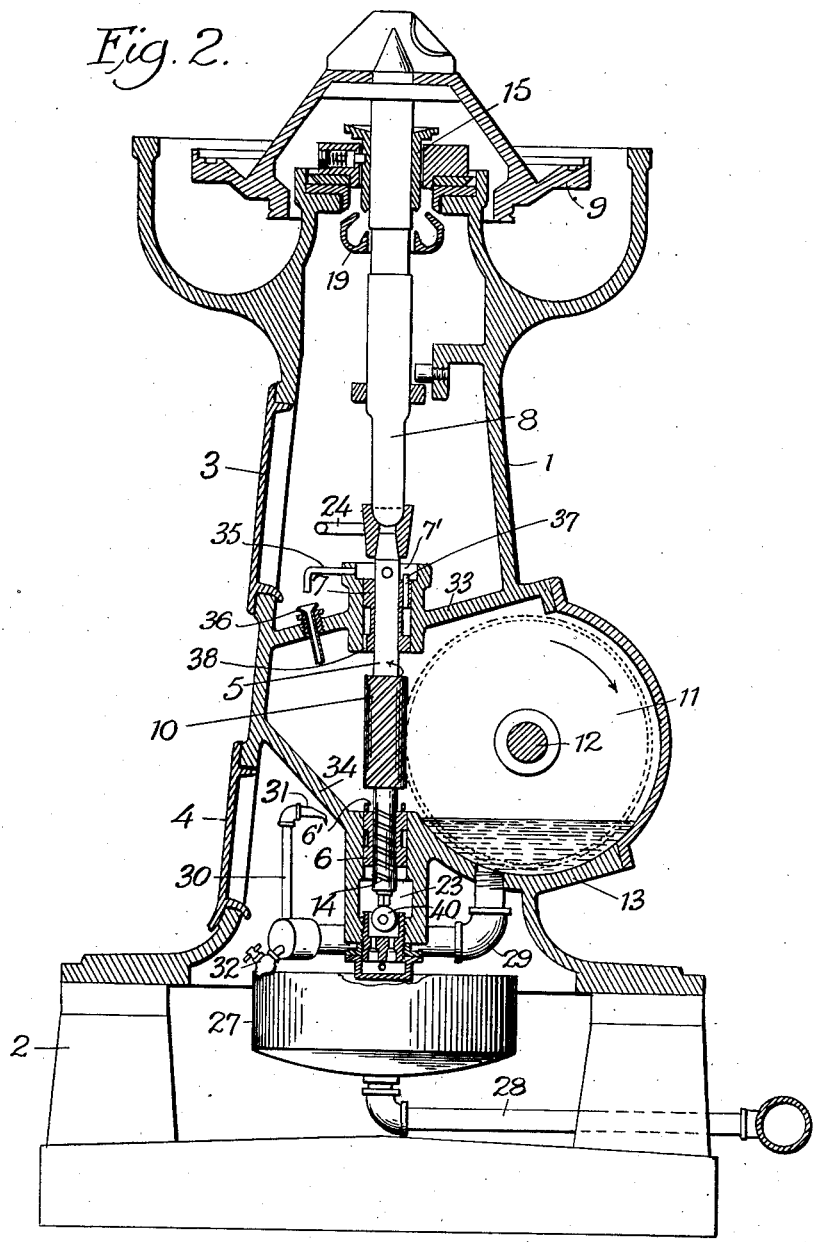
Fig. 2 represents a sectional view of the same portion of the separator taken at right angles to the view shown in Fig. 1.
Figure 3:
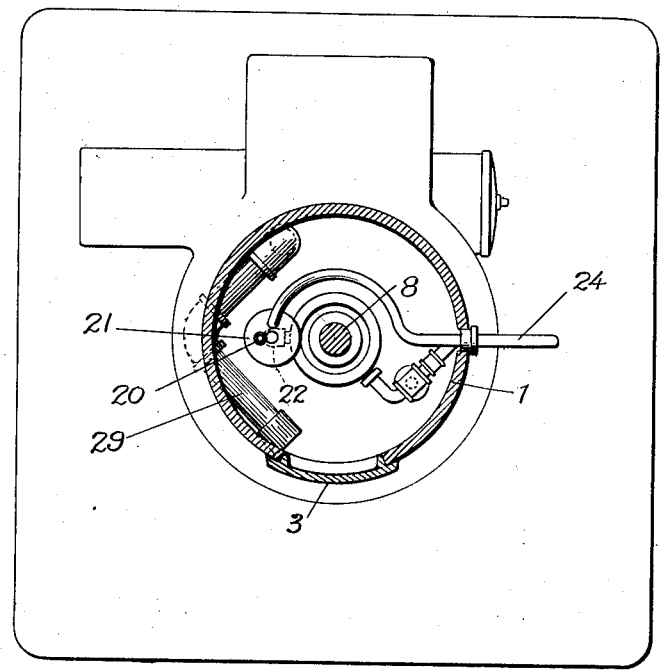
Fig. 3 represents a plan view of certain portions of the separator taken along the line 3—3 of Fig. 1.

As an additional feature of my invention, as is clearly illustrated in Fig. 2 of the drawings, the middle bearing 7 may be provided with one or more overflow outlets for drainage of any excess oil which tends to accumulate in the oil pocket 7' at the upper end of the bearing 7. For this purpose, I may provide an overflow pipe 35 leading from the oil pocket 7' at a level slightly above the top of the bearing 7 itself and extending through the oil pocket wall which may be formed by an extension of the upper portion of the bearing casing, which pipe 35 may be arranged to discharge by gravity to a pipe 36 (which may be provided with a funnel-shaped top) through which oil may further flow by gravity into the next lower compartment of the separator casing or frame and to the trough 13 and the oil pocket of the lower separator shaft bearing. Also to permit of drainage of excess oil from above the top of the bearing 7, I may further provide oil drainage passages 37, 38 leading through the bushing of the bearing 7 (as shown in Fig. 2 of the drawings) and the passage 37 may comprise a pipe, the upper end of which extends slightly above the top of the bushing of bearing 7, so as to permit (as in the case of the overflow pipe 35) some oil to remain superposed in the oil pocket 7' above the bearing 7 while excess oil may flow by gravity through passages 37, 38.

As shown in Fig. 1, a pipe 39 is provided, through which oil which may be collected in the casing or frame of the separator above the horizontal partition, in which the bearing 7 is mounted, may drain by gravity in the receptacle 27 at the base of the separator.

What I claim and desire to protect by Letters Patent is:

1. In a centrifugal separator having a vertical shaft and a plurality of bearings, one above another, in which said shaft is mounted to rotate, an oiling system comprising means for feeding oil by gravity downwardly to and through said bearings, in combination with a screw pump located inside one of the lower of said bearings for augmenting the flow of oil into and through said bearing by exerting positive downward pressure thereon as it flows through said bearing, and means for utilizing said pressure to conduct oil from said bearing to the oil inlet of a shaft bearing at a higher level.

2. In a centrifugal separator having a vertical shaft and a plurality of bearings, one above another, in which said shaft is mounted to rotate, an oiling system comprising means for feeding oil by gravity downwardly to and through said bearings, in combination with a screw pump located inside one of the lower of said bearings, said pump including a helical peripheral groove on said shaft for augmenting the flow of oil into and through said bearing by exerting positive downward pressure thereon as it flows through said bearing and means for utilizing said pressure to conduct oil from said bearing to the oil inlet of a shaft bearing at a higher level.

3. In a centrifugal separator having a vertical shaft and a plurality of bearings, one above another, in which said shaft is mounted to rotate, an oiling system comprising means for feeding oil by gravity downwardly to and through said bearings, said shaft being provided within one of the lower of said bearings with a helical groove of such pitch and cut in such a direction with respect to the direction of rotation of the shaft as to exert positive downward pressure on the oil within said bearing and means for conducting oil flowing under pressure from said bearing to the oil inlet of a shaft bearing at a higher level.

4. In a centrifugal separator, in combination, a casing, a driving gear within said casing, an oil pocket into which the lower portion of the driving gear extends, an oil and sediment drain pipe leading downwardly from the bottom of said oil pocket and provided with an upwardly extending discharge pipe having its outlet at a level above the level of the bottom of the oil pocket so as to serve as a gravity separating and constant level overflow device.

5. A device of the class described, comprising, in combination, a plurality of bearings each having a vertical shaft operating therein, and a lubricating system for said bearings including means for feeding lubricant to the upper end of one bearing, that portion of the shaft located within said bearing being equipped with a helical peripheral groove for forcing oil down through the bearing under positive pressure and a conduit in pressure tight communication with the lower end of said bearing for conveying lubricant under said positive pressure to another bearing at a higher level.

6. A device of the class described, comprising, in combination, a plurality of bearings, a vertical shaft mounted for rotation within said bearings, a screw pump inside one of said bearings for exerting positive downward pressure on the oil within said bearing to promote flow of oil downwardly through the bearing, a casing in pressure tight association with said bearing to receive the oil forced therethrough, and means for conducting oil under the action of said positive pressure from said casing to another bearing at a higher level.

7. A device of the class described, comprising, in combination, a plurality of bearings, each having a vertical shaft operating therein, and a lubricating system for said bearings including means for feeding lubricant to the upper end of one bearing, means for transmitting such lubricant downwardly therethrough under the combined action of gravity and positive pressure, said means including a helical peripheral groove on that portion of the shaft which is located inside such bearing, a casing in pressure tight association with said bearing to receive the oil forced therethrough, a conduit for conveying lubricant from said casing under said positive pressure to another bearing at a higher level and means for conveying the lubricant from said latter bearing to the lower bearing in a cyclic oil-circulating system.

8. A device of the class described, comprising, in combination, a plurality of bearings one above another, a vertical shaft mounted for rotation within said bearings, means for feeding oil downwardly to and through said bearings successively, a screw pump within one of the lower of said bearings for applying positive downward pressure to the oil in said bearing to promote circulation of oil through this bearing, a casing in pressure tight association with said bearing to receive the oil forced therethrough, and a conduit for conveying oil from said casing under the action of said positive pressure to the oil inlet of another of said bearings at a higher level.

HENRY GEORGE KOEPKE.